(12) United States Patent
Wysong (10) Patent No.: US 7,303,145 B2
(45) Date of Patent: Dec. 4, 2007

(54) VEHICLES AND BULK MATERIAL DISTRIBUTION APPARATUSES INCLUDING AIR FLUSH SYSTEM AND METHODS

(75) Inventor: Douglas E. Wysong, Camden, OH (US)

(73) Assignee: Finn Corporation, Fairfield, OH (US)

( * ) Notice: Subject to any disclaimer, the term of this patent is extended or adjusted under 35 U.S.C. 154(b) by 237 days.

(21) Appl. No.: 11/065,733

(22) Filed: Feb. 25, 2005

(65) Prior Publication Data

US 2006/0192024 A1    Aug. 31, 2006

(51) Int. Cl.
- B05B 15/02 (2006.01)
- B05B 9/00 (2006.01)
- E01C 19/20 (2006.01)
- A01C 7/08 (2006.01)
- A01C 15/00 (2006.01)

(52) U.S. Cl. .................. 239/106; 239/8; 239/104; 239/112; 239/124; 239/172; 239/650

(58) Field of Classification Search ............. 239/106, 239/8, 104, 112, 124, 147, 172, 113, 119, 239/127, 146, 302, 311, 329, 332, 650, 662, 239/670, 722, DIG. 21; 406/38, 39, 41; 137/237, 239; 222/630, 637; 111/127
See application file for complete search history.

(56) References Cited

U.S. PATENT DOCUMENTS

| | | | | |
|---|---|---|---|---|
| 3,219,275 A | * | 11/1965 | Green | 239/172 |
| 5,361,711 A | * | 11/1994 | Beyerl | 111/127 |
| 5,817,184 A | * | 10/1998 | Lawrence | 134/22.12 |
| 6,036,406 A | * | 3/2000 | Rexius | 406/39 |
| 6,164,556 A | * | 12/2000 | Dupre et al. | 239/14.2 |
| 6,357,971 B1 | * | 3/2002 | Rexius | 406/43 |
| 6,695,220 B2 | * | 2/2004 | Vollmer | 239/8 |
| 7,083,069 B2 | * | 8/2006 | Wysong et al. | 222/129 |

* cited by examiner

Primary Examiner—Kevin Shaver
Assistant Examiner—Darren Gorman
(74) Attorney, Agent, or Firm—Dinsmore & Shohl (57) ABSTRACT

An air flush system for a spraying system includes an air compressor unit and an inverter. The air compressor unit integrally comprises a compressor including an electric motor configured to operate upon receipt of alternating current voltage, a tank provided in fluid communication with the compressor and configured to store air compressed by the compressor; and an outlet provided in fluid communication with the tank and configured to selectively dispense compressed air from the tank to a portion of a spraying system to facilitate purging of material from the spraying system. The inverter is configured to selectively convert direct current voltage from a vehicular electrical system into alternating current voltage suitable to operate the compressor. A method for cleaning a spraying apparatus is also provided.

23 Claims, 4 Drawing Sheets

VEHICLES AND BULK MATERIAL DISTRIBUTION APPARATUSES INCLUDING AIR FLUSH SYSTEM AND METHODS

TECHNICAL FIELD

The present invention relates to vehicles and bulk material distributing apparatuses including an air flush system, and to methods for cleaning a spraying apparatus, for example a bulk material distributing apparatus.

BACKGROUND OF THE INVENTION

Clearing the various conduits and chambers of a mobile spraying apparatus, such as on a vehicle which can be transported to remote locations for use, can often be difficult and time consuming. Such spraying apparatuses can be configured, for example, to dispense seed, bark, mulch, landfill cover, and/or a variety of other ingredients. Each such spraying apparatus typically includes a reservoir, a pump, a nozzle, and one or more conduits connecting the reservoir, the pump, and the nozzle. In some circumstances, after spraying material (e.g., a grass seed slurry), it is beneficial to purge the conduit(s), the nozzle, and/or the pump to prevent a buildup of material therein that could obstruct proper flow during the next use of the spraying apparatus or after repeated uses of the apparatus.

Water is often used to purge a vehicular spraying apparatus. However, unless the vehicle will always be cleaned in the vicinity of a water source (e.g., a pond, fire hydrant, or water faucet), the vehicle must include its own portable water source (i.e., a water tank) for use in such cleaning operations. Requiring a spraying apparatus to be located near a water source to enable purging is often not practical because it is generally most convenient to clean the spraying apparatus immediately after use. Furthermore, in the time it would take for a vehicle to travel to a water source, the material accumulated within the spraying apparatus can harden, and can therefore be resistant to purging. However, any sufficiently sized water tank associated with the vehicle would add a significant amount of weight, thereby requiring an oversized vehicle and/or a reduction in capacity for sprayable material. For these reasons, water is not an effective option for use in purging or cleaning a vehicular spraying apparatus.

Compressed air can also be used to purge components of a spraying apparatus. For example, when a spraying apparatus is associated with a large truck, the truck can include an engine-driven air compressor that generates compressed air for storage within a reservoir (e.g., typically for use by air brakes). Air from this reservoir can be directed into the spraying apparatus to evacuate various components thereof. However, many spraying apparatuses are often not associated with such large trucks, and smaller trucks and trailers typically do not include engine-driven air compressors. Installation of engine-driven air compressors on smaller trucks and trailers can be very expensive and time consuming. Also, when such an engine-driven air compressor is installed in this manner, it is typically necessary to additionally install an air tank, piping, and other related components, thereby further increasing costs, engineering time, and assembly time.

In lieu of an engine-driven air compressor, an air compressor can be provided to operate directly from a vehicle's low voltage direct current electrical system (e.g., commonly provided as 6 V.D.C., 12 V.D.C., or 24 V.D.C.) or from a vehicle's hydraulic system. However, such air compressors are typically extremely expensive, are difficult to source due to relatively low market availability, and can in many circumstances be unreliable due to lack of adequate robustness. Also, when such an air compressor is installed, it is typically necessary to additionally install an air tank, piping, and other related components, thereby further increasing costs, engineering time, and assembly time.

Accordingly, there is a need for an air flush system for a spraying apparatus that is relatively inexpensive, is easy to install, requires little engineering time, and is quite reliable.

SUMMARY OF THE INVENTION

It is an aspect of the present invention to provide an air flush system for a spraying apparatus that is relatively inexpensive, is easy to install, requires little engineering time, and is quite reliable.

In one exemplary embodiment of the present invention, a vehicle comprises a mobile base, and an electrical system that is secured to the base and is configured to provide direct current voltage. A bulk material spraying system is secured to the base and comprises a reservoir configured to store material for spraying, a first conduit connected with the reservoir, a second conduit, and a pump. The pump is connected with both the first and second conduits and is configured to receive material from the reservoir through the first conduit and to discharge received material through the second conduit. A purge inlet is provided in fluid communication with at least one of the first and second conduits. An air flush system is secured to the base and comprises an air compressor unit and an inverter. The air compressor unit integrally comprises a compressor including an electric motor configured to operate upon receipt of alternating current voltage, a tank provided in fluid communication with the compressor and configured to store air compressed by the compressor, and an outlet. The outlet is provided in fluid communication with the tank and is configured to selectively dispense compressed air from the tank for passage to the purge inlet to facilitate purging of material from at least one of the first conduit, the second conduit, the pump, and the reservoir. The inverter is electrically coupled with the electrical system and with the air compressor unit and is configured to selectively convert direct current voltage from the electrical system into alternating current voltage suitable to operate the compressor.

In another exemplary embodiment of the present invention, a bulk material distributing apparatus comprises a bulk material spraying system for spraying bulk material from the apparatus. The bulk material distributing apparatus further comprises an air flush system. The air flush system comprises an air compressor unit and an inverter. The air compressor unit integrally comprises a compressor including an electric motor configured to operate upon receipt of alternating current voltage, a tank provided in fluid communication with the compressor and configured to store air compressed by the compressor, and an outlet. The outlet is provided in fluid communication with the tank and is configured to selectively dispense compressed air from the tank to a portion of the bulk material spraying system to facilitate purging of material from the bulk material spraying system. The inverter is electrically coupled with the air compressor unit and with an electrical system on the bulk material distributing apparatus and is configured to selectively convert direct current voltage from an electrical system on the bulk material distributing apparatus into alternating current voltage suitable to operate the compressor.

In still another exemplary embodiment of the present invention, a method for cleaning a spraying apparatus is provided. The method comprises providing an air compressor unit that integrally comprises a compressor including an electric motor configured to operate upon receipt of alternating current voltage, a tank provided in fluid communication with the compressor and configured to store air compressed by the compressor, and an outlet provided in fluid communication with the tank. The outlet of the air compressor is connected to a purge inlet of the spraying apparatus. The purge inlet is in fluid communication with at least one of a conduit, a reservoir, a nozzle, and a pump provided on the spraying apparatus. Alternating current voltage is provided to the compressor so that compressed air is provided into the tank. Compressed air is discharged from the tank through the outlet and into the purge inlet for purging material from the spraying apparatus.

Advantageously, the air flush system included in the vehicle and bulk material discharge apparatus of the invention is relatively inexpensive, is easy to install, requires little engineering time, and is quite reliable. Additional aspects, advantages, and novel features of the invention will be set forth in part in the description that follows and in part will become apparent to those skilled in the art upon examination of the following, or may be learned with the practice of the invention. Various aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
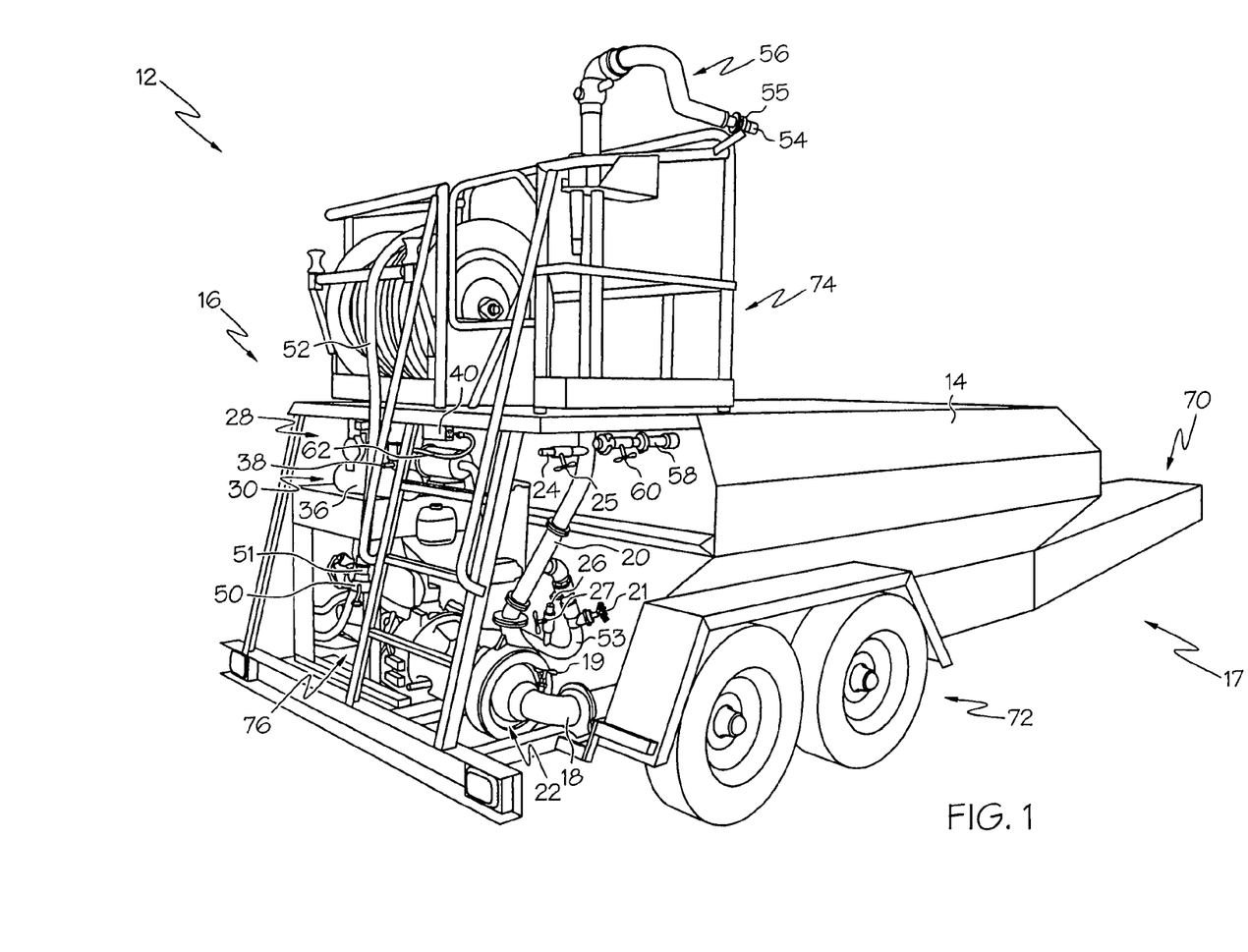
FIG. 1 is a rear perspective view of a trailer equipped with a bulk material spraying system and an air flush system in accordance with one exemplary embodiment of the present invention.

The present invention and its operation are hereinafter described in detail in connection with the views and examples of FIGS. 1-4, wherein like numbers indicate the same or corresponding elements throughout the views. These embodiments are shown and described only for purposes of illustrating examples of elements of the invention, and should not be considered as limiting on alternative structures or assemblies that will be apparent to those of ordinary skill in the art. Referring to FIG. 1, a spraying apparatus, such as an exemplary bulk material distributing apparatus 12, can include a bulk material spraying system 16 being supported upon a mobile base (e.g., a vehicle such as a trailer 17). The bulk material spraying system 16 can be configured, for example, to spray an aqueous slurry including seed. The trailer 17 is shown to comprise a tongue 70 to facilitate connection and towing of the trailer 17 by a vehicle such as a truck. The trailer 17 is also shown to include wheels 72. Instead of comprising a trailer, it should be appreciated that an exemplary bulk material distributing apparatus could alternatively comprise any of a variety of other vehicles including, for example, a truck. It should also be understood that an exemplary bulk material spraying apparatus can be provided as a stationary unit (e.g., can rest upon and/or can be attached to the floor or the ground).

The bulk material spraying system 16 is shown to include a sump or reservoir 14 for holding material to be sprayed. Such material can include any of a variety of ingredients, such as, for example, mulch, bark, straw, wood chips, fibrous slurry, shredded paper, seed, water, surfactant, foam, fertilizer, and/or dye. The bulk material spraying system 16 can also include a number of components for conveying the material from the reservoir 14 to one or more nozzles (e.g., 50, 54), many of which components are shown FIGS. 1 and 3. One skilled in the art will appreciate that the bulk material spraying system 16 may include two or more sumps or reservoirs in the event, for example, that it is desirable to separately store materials to be sprayed. For example, a first reservoir may hold seed while a second reservoir holds water, and the bulk material spraying system 16 can include components for discharging these materials sequentially or combining the materials for simultaneous discharge. While one or more nozzles (e.g., 50, 54) can be configured to spray material directly upon a surface to be coated (e.g., a ground surface), one or more nozzles might additionally or alternatively be configured to spray material into a container. For example, an exemplary material spraying system in accordance with the teachings of the present invention might include a nozzle for use in spraying material into a basket, whereby a helicopter can then pick up the filled basket, can hover the basket over ground to be covered, and can then facilitate the selective release of material from the basket.

Figure 3:
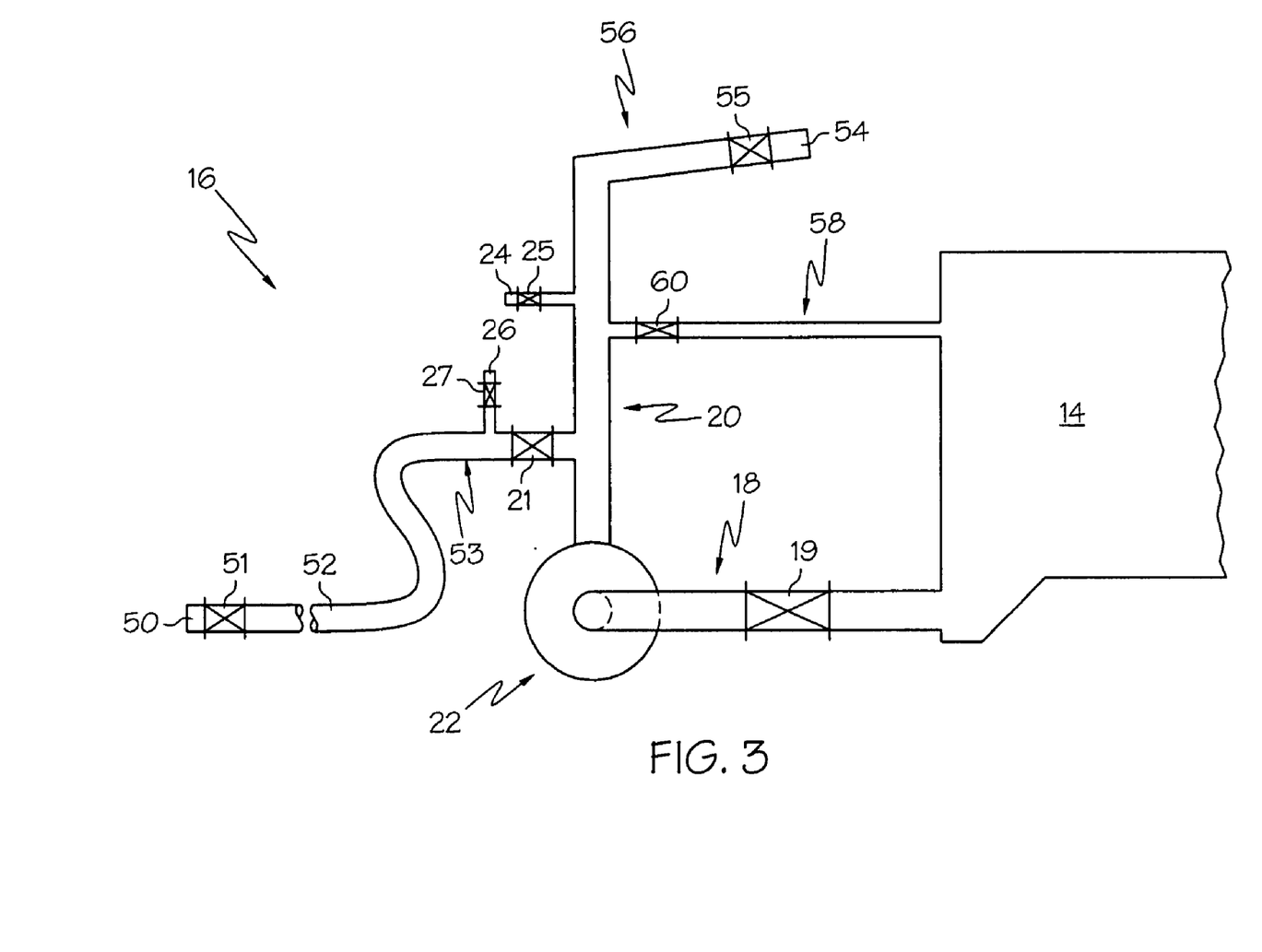
FIG. 3 is a schematic view depicting certain flow passages of the exemplary systems of FIG. 1.

A first conduit 18 is shown in FIGS. 1 and 3 to comprise a suction line which connects with the reservoir 14 and receives from the reservoir 14 material to be sprayed. This first conduit 18 can connect with a pump 22 through a valve 19. The pump 22 is shown in FIG. 1 to be driven by a gasoline or diesel engine, but it should be appreciated that the pump 22 might otherwise be electrically, mechanically, or hydraulically driven. A second conduit 20 connects with the outlet of the pump 22 to receive material from the reservoir 14 which has been pressurized by the pump 22.

Many connections can be provided to the second conduit 20. For example, the second conduit 20 can connect with a discharge boom 56 that is controllable by an operator who is standing on a deck 74. The discharge boom 56 is shown to include both a valve 55 and a nozzle 54. When the valve 55 is opened by an operator, pressurized material is free to flow from the second conduit 20 and through the nozzle 54. In alternate embodiments, the valve 55 might not be disposed so closely to the nozzle 54, but might alternatively be located elsewhere. The second conduit 20 can also connect through a valve 21 to a conduit section 53, which in turn can connect with a discharge hose 52. The discharge hose 52 is shown as being provided with a valve 51 and a nozzle 50. In use, an operator can selectively open the valve 51 to facilitate discharge of pressurized material through the nozzle 50. The second conduit 20 is also shown as being connected through a valve 60 to a third conduit 58 which leads back into the reservoir 14. By virtue of this connection with both the second conduit 20 and the reservoir 14, the third conduit 58 can be configured as a recirculation line to provide recirculation of material from the pump 22 to the reservoir 14, as desired.

A first purge inlet 24 is shown as being connected to the second conduit 20 through a valve 25. A second purge inlet 26 is shown as being connected, through a valve 27, to the conduit section 53. In one exemplary embodiment of the present invention, each of the first and second purge inlets 24, 26 can comprise quick-connect fittings, such as the type that are typically used in conjunction with hand operated air tools and/or hydraulic tools. The first and second purge inlets 24, 26 can be similarly configured in order that a single connector can be suitable to interface either of them. However, in alternate embodiments, it should be appreciated that the first and second purge inlets 24, 26 might be configured differently.

The valves 25, 27 can be selected from any of a variety of suitable valve types. For example, the valves 25, 27 might comprise ball valves of a type which can be manually controlled by an operator. In another exemplary embodiment, such valves 25 and 27 may be integral with the purge inlets 24, 26, respectively, such that valves 25, 27 might be opened automatically upon connection of a hose or other conduit to the purge inlets 24, 26. In still another embodiment of the present invention, these valves might be connected with a pneumatic, electric and/or hydraulic actuator to facilitate remote actuation by an operator without any need for the operator to directly contact the valve and/or its associated purge inlet.

Figure 2:
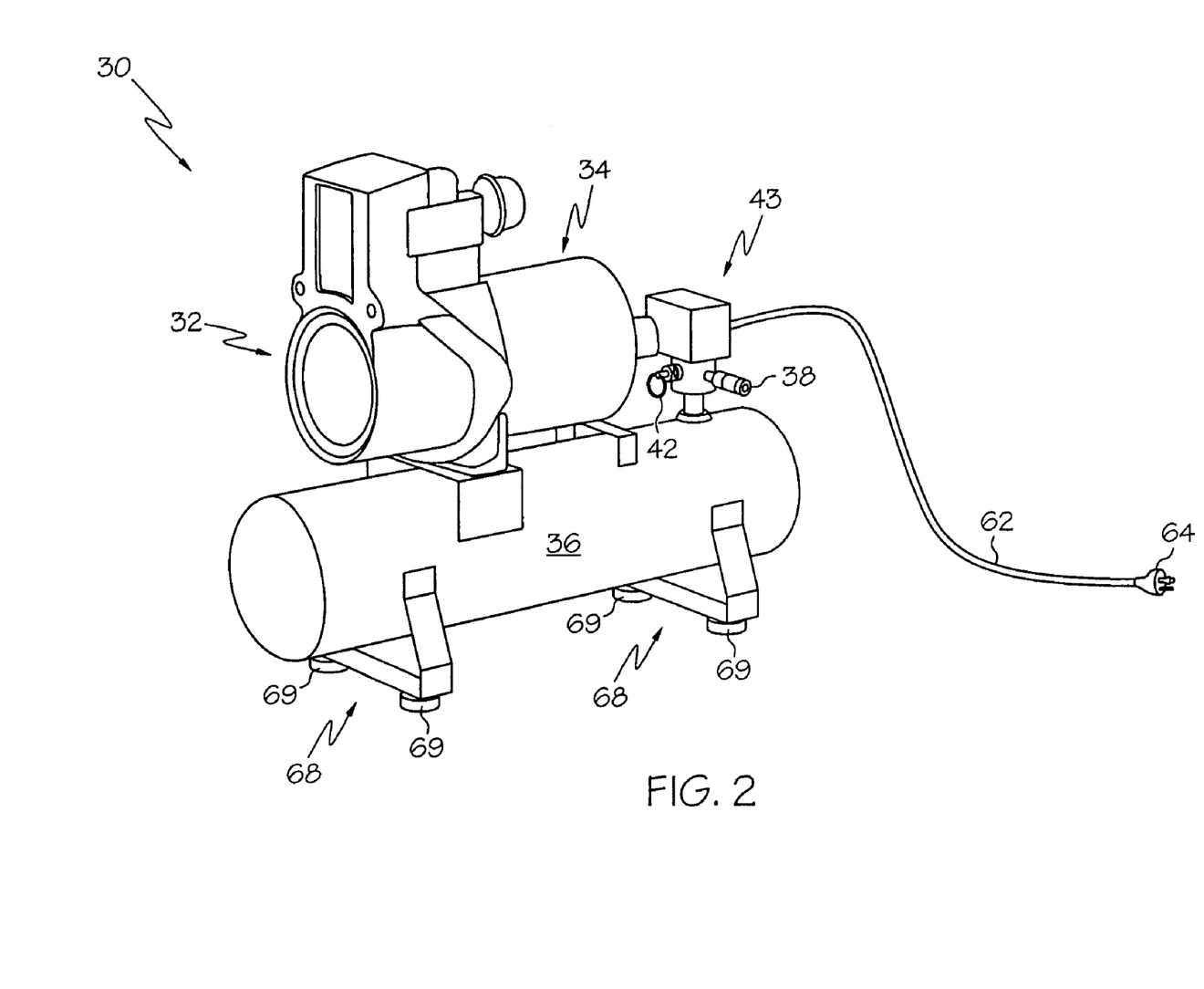
FIG. 2 is an enlarged perspective view depicting the air compressor unit of FIG. 1.

The bulk material spraying system 16 is shown in combination with an air flush system 28 which includes an air compressor unit 30, which is also depicted in FIG. 2. Such an air compressor unit (e.g., 30) has in recent years become quite a consumer commodity, and can accordingly be readily and inexpensively found off-the-shelf in many auto parts and consumer home goods stores. Such stores usually carry a selection of such devices, typically with differing power ratings and tank capacities, and often by differing manufacturers. Such an air compressor unit (e.g., 30) can integrally provide any and all components that are necessary to generate and store compressed air upon receipt of 120 Volts Alternating Current (V.A.C.), thereby avoiding the need for any ancillary components to facilitate these functions. Alternating current, as used herein, includes voltage signals which have a true sinusoidal waveform, as well as voltage signals which do not have true sinusoidal waveforms, but rather have simulated sinusoidal waveforms achieved through pulse-width-modulation or the like.

Among those components integrally provided by the air compressor unit 30 are a compressor 32 including an electric motor 34, a tank 36, an outlet 38, a pressure relief valve 42, a control box 43, a pressure sensitive switch 44, and a power cord 62, all of which are depicted in FIGS. 1-4. The pressurized air generated by the compressor 32 can be directed to the tank 36 and to the outlet 38. The outlet 38 can be configured to facilitate selective dispensation of compressed air from the compressor 32. In an alternate embodiment, the outlet 38 can be configured to facilitate selective dispensation of compressed air from the compressor 32 and/or the tank 36.

In one embodiment, the compressor 32 includes a piston which is cooled and lubricated with oil. Such a compressor 32 can be extremely durable and can provide high rates of compression, but requires periodic maintenance (to change the oil) and must typically be mounted in a predetermined orientation. Alternatively, the compressor 32 can be an oil-less compressor which requires virtually no maintenance, is typically smaller than an oil-type compressor, and can typically be positioned in virtually any orientation.

In one embodiment, the tank 36 has a capacity between about 1.5 gallons and about 3 gallons. However, other tank capacities might alternatively be provided depending upon the capacities of conduits, hoses and/or other components to be purged by the air flush system 28, and further depending upon the amount of space available on the vehicle for mounting of the air compressor unit 30. The pressure relief valve 42 can be provided in fluid communication with the tank 36 and the compressor 32, and can be configured to selectively release air from the compressor 32 and/or the tank 36 to prevent overpressurization.

One or more pressure sensitive switches (e.g., switch 44 in FIG. 4), regulators, power switches, pressure gauges, and/or other controls can be provided within or otherwise associated with the control box 43. The power cord 62 can interface the control box 43, and can provide power to the air compressor unit 30. The power cord 62 can be provided with a plug 64 for receiving power. The plug 64 can be of a conventional three-prong, 120 V.A.C., variety which is receivable by typical wall receptacles present within the United States of America.

Although the air compressor unit 30 can be purchased as a portable device, it might be secured to a spraying apparatus (e.g., to a base of the bulk material distributing apparatus 12). For example, the air compressor unit 30 is shown in FIG. 2 to include one or more brackets 68 to facilitate mounting of the air compressor unit 30 on the bulk material distributing apparatus 12. The brackets 68 can each include or can be modified to include one or more cushioning feet 69 to dampen vibrations from passing between the air compressor unit 30 and other components of the bulk material distributing apparatus 12.

Referring again to FIG. 1, the air flush system 28 can also include an inverter 40, particularly when the air flush system 28 is provided for use with a mobile spraying system, such as that depicted in FIG. 1. Although the inverter 40 is shown to be mounted below the deck 74, it should be appreciated that the inverter 40 could alternatively be located in any of a variety of suitable locations on the bulk material distributing apparatus 12. In accordance with the present invention, the inverter 40 can be electrically coupled with a direct current voltage source of the spraying apparatus (e.g., 12 Volts Direct Current (V.D.C.)) and can be configured to selectively convert this direct current voltage into alternating current voltage (e.g., 120 V.A.C.). Such inverter devices have in recent years become quite a consumer commodity, and can accordingly be readily and inexpensively found off-the-shelf in many auto parts and consumer home goods stores. Such stores usually carry a selection of such devices, typically with differing power ratings, and often by differing manufacturers.

Figure 4:
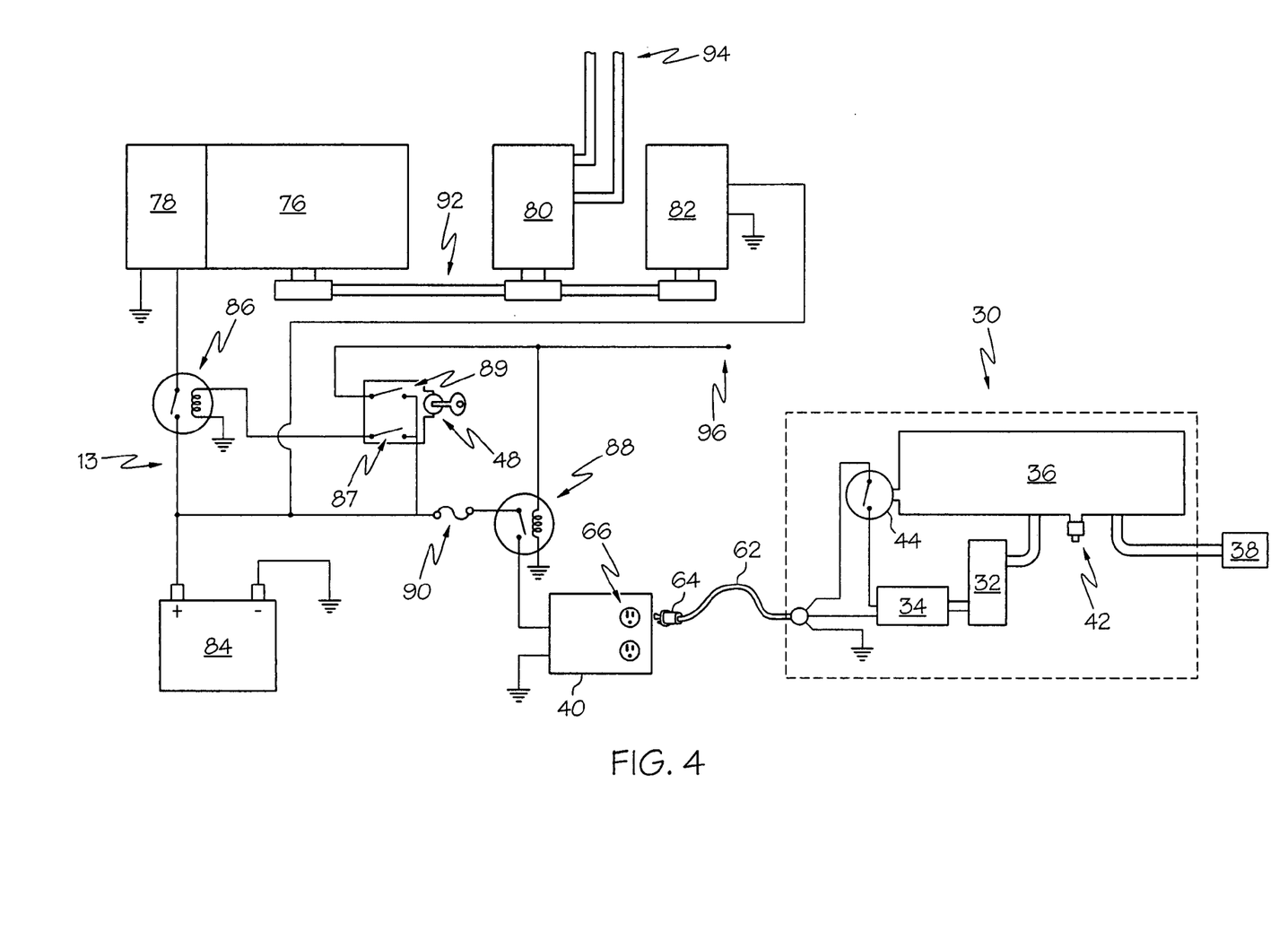
FIG. 4 is a schematic view depicting certain of the electrical connections of the systems of FIG. 1.

FIG. 4 depicts the relevant portion of an exemplary electrical system 13 that might be provided upon the bulk material distributing apparatus 12. The electrical system 13 is shown to comprise a low-voltage direct current system which is typical of many motor vehicles, and which comprises as a power source at least one of a battery 84 and/or a generator or alternator assembly 82. An engine 76 of the bulk material distributing apparatus 12 is shown to be connected with a starter 78 which is configured to rotate a crankshaft of the engine 76 upon receipt of electrical power (e.g., 12 V.D.C.) from the battery 84. The crankshaft of the engine 76 is shown as being coupled with both a hydraulic pump 80 and an alternator assembly 82 through use of a mechanical coupling arrangement 92 which is shown in FIG. 4 to include a belt and pulley configuration. It will be appreciated, however, that any of a variety of alternative mechanical coupling arrangements might be provided. The hydraulic pump 80 is shown to interface hydraulic conduits 94 which lead to a hydraulic system for powering other components on the bulk material distributing apparatus 12, such as a hydraulic motor to operate the pump 22. In some embodiments of a bulk material distributing apparatus, the hydraulic pump 80 might not be provided, but the engine 76 might alternatively connect directly to the pump 22 through a mechanical linkage.

The alternator assembly 82 can include a voltage regulator device to ensure that power output from the alternator assembly 82 is suitable for charging the battery 84. The alternator assembly 82 is shown to connect to the battery 84 to facilitate charging of the battery 84 during rotation of the alternator assembly 82. A first relay 86 is shown to be provided between the battery 84 and the starter 78. When the coil of the first relay 86 is energized, the contacts of the first relay 86 can connect, thereby enabling power to flow from the battery 84 to the starter 78, which therefore results in rotation of the engine's crankshaft by the starter 78, and the resultant starting of the engine 76.

Power is shown to be selectively applied to the coil of the first relay 86 by a first contact set 87 of an ignition switch 48. The first contact set 87 can be closed when the ignition switch 48 is turned to a predetermined position (e.g., the "start" position). The ignition switch 48 can also include a second contact set 89 which can be closed when the ignition switch is turned to another predetermined position (e.g., the "accessory" position). When the second contact set 89 is closed, power can be applied to accessories (e.g., lights) on the bulk material distributing apparatus 12 through connection point 96, and can also be applied to the coil of a second relay 88. When power is applied to the coil of the second relay 88, power received from the battery 84 through a fuse (or circuit breaker) 90 is allowed to pass through the second relay 88 to the inverter 40. The inverter 40 converts this low voltage direct current electrical power (e.g. 12 V.D.C.) to approximately 120 V.A.C. for dispensation through an integral receptacle 66.

The plug 64 on the end of the power cord 62 from the air compressor unit 30 can be configured for insertion into the receptacle 66 of the inverter 40. However, it will be appreciated that one or more power conditioning components (e.g., a link choke, line reactor, or transformer) might additionally be provided, and may even be connected between the inverter 40 and the air compressor unit 30. For example, the power conditioning components might receive power from the receptacle 66, and can then pass this power along to the power cord 62. These line conditioning components might be useful in some circumstances to help make the voltage and/or current output of the inverter 40 to be more sinusoidal in shape, and to therefore more effectively operate the air compressor unit 30 and/or any other devices powered by the inverter 40.

Once received into the air compressor unit 30, this power is shown to be passed through a pressure sensitive switch 44 before being allowed to enter the electric motor 34. The pressure sensitive switch 44 is shown to be provided in fluid communication with the tank 36, and is shown in FIG. 4 to be in the opened position, which would be the case when the tank 36 is fully pressurized. When the pressure within the tank 36 subsides, the pressure sensitive switch 44 can close, thereby allowing power to flow to the electric motor 34. In this manner, the pressure sensitive switch 44 is configured to facilitate the automatic replenishment of pressurized air within the tank 36 when such air is at least partially depleted, but to then effect removal of electrical power from the electric motor 34 when the pressure of compressed air within the tank 36 reaches a predetermined maximum value. The pressure sensitive switch 44 can thus prevent overpressurization of the tank 36. One or more additional pressure sensitive switches might also be provided.

When an operator of the bulk material distributing apparatus 12 engages the ignition switch 48, such as by turning the ignition switch 48 to the "accessory" position, the second contact set 89 within the ignition switch 48 can be closed, thereby activating the coil of the second relay 88. With the coil of the second relay 88 activated, power can be applied from the battery 84, through the fuse 90, and to the inverter 40, which thereby converts this low voltage direct current power to 120 V.A.C. The air compressor unit 30 receives this 120 V.A.C. from the inverter through the receptacle 66 and through the power cord 62. The electric motor 34 can then operate as necessary to maintain a predetermined pressure range within the tank 36. Air can be accessed from the tank 36 at the outlet 38 of the air compressor unit 30 as desired by an operator. In this exemplary configuration, the electric motor 34 in the air compressor unit 30 can only operate when an operator has activated the ignition switch 48, thereby preventing depletion of the battery 84 when the bulk material distributing apparatus 12 is not in use. The ignition switch 48 can thus be configured to selectively facilitate electrical connection of the inverter 40 to the electrical system 13 of the bulk material distributing apparatus 12, and the inverter 40 can then supply alternating current voltage to the air compressor unit 30.

An operator may connect one or more hoses or conduits from the outlet 38 of the air compressor unit 30 to one or more purge inlets (e.g. first and second purge inlets 24 and 26) of the bulk material spraying system 16. For example, an operator might use a flexible hose to make such a connection, such as the type of hose that is typically used to connect portable air tools to an air compressor. Such a hose might optionally include quick-connect couplings on one or both ends to facilitate easy connection and disconnection of the hose from the outlet 38 and/or the purge inlets (e.g., 24, 26). Alternatively, semi-permanent connections can be provided between an air compressor unit 30 and one or more purge inlets (24, 26). For example, such semi-permanent connections could include rigid piping and/or flexible piping that is attached to the outlet 38 and to at least one purge inlet (e.g., 24, 26) in a manner which is not readily removable (e.g., involves threaded connections that require a wrench to adjust, as well as one or more in-line valves to facilitate selective allowance of fluid communication therethrough).

The air flush system 28 can be effectively used to clear accumulated material from portions of the bulk material spraying system 16. For example, by connecting the outlet 38 of the air compressor unit 30 to the purge inlet 26, opening the valve 27, closing the valve 21, and opening the valve 51, material can be purged from the discharge hose 52 through the nozzle 50 under force of compressed air from the tank 36. Hence, the outlet 38 can be configured to selectively dispense compressed air from the tank 36 for passage to the purge inlet 26 to facilitate purging of material from the discharge hose 52. As another example, by alternatively connecting the outlet 38 of the air compressor unit 30 to the purge inlet 24, opening the valve 25, closing the valve 21, closing the valve 19, closing the valve 60, and opening the valve 55, material can be purged from the discharge boom 56 through the nozzle 54 under force of compressed air from the tank 36. Hence, the outlet 38 can be configured to selectively dispense compressed air from the tank 36 for passage to the purge inlet 24 to facilitate purging of material from the discharge boom 56.

As still another example, by connecting the outlet 38 of the air compressor unit 30 to the purge inlet 24, opening the valve 25, closing the valve 19, closing the valve 21, closing the valve 55, and opening the valve 60, the third conduit 58 can be purged into the reservoir 14 under force of compressed air from the tank 36. As the reservoir 14 is typically open to the atmosphere via a material loading port, pressurized air entering the reservoir (e.g., though the third conduit 58 or the first conduit 18) can be discharged to the atmosphere. Hence, the outlet 38 can be configured to selectively dispense compressed air from the tank 36 for passage to the purge inlet 24 to facilitate purging of material from the third conduit 58. As yet another example, by connecting the outlet 38 of the air compressor unit 30 to the purge inlet 24, opening the valve 25, closing the valve 21, closing the valve 60, closing the valve 55, and opening the valve 19, the pump 22 and the first conduit 18 can be purged into the reservoir 14 under force of compressed air from the tank 36. Any of a variety of other valve purge arrangements can be achieved as will be appreciated by those skilled in the art. Furthermore, one or more additional purge inlets can be provided at other locations of the bulk material spraying system 16 to facilitate alternative and/or additional purge opportunities.

The air flush system 28 might also provide an operator with direct access to power from the inverter 40. For example, the inverter 40 might be positioned such that an operator can readily access its receptacle 66, and/or one or more remote receptacles can be connected with the receptacle 66 but disposed remotely from the inverter 40 upon the associated vehicle. In this manner, the inverter 40 can provide a source of regular household-type power (e.g., 120 V.A.C.) for use as needed for incidental purposes by an operator of the associated vehicle, such that an operator can accordingly plug a radio, power tool, lamp, and/or other device into the receptacle 66 for receiving power therefrom. It will be appreciated that an inverter might not be provided on an exemplary spraying apparatus which is stationary and which has access to a fixed source of electrical power (e.g., a wall receptacle).

Likewise, an operator might be provided with access to pressurized air from within the tank 36 of the air compressor unit 30 in order that he or she may operate handheld air tools, tire inflation devices, air nozzles, or other such tools or devices. For example, such tools or devices can be connected directly to the outlet 38 of the air compressor unit 30, or can alternatively be connected to one or more remote outlets that are connected with the air compressor unit 30 but are associated with the vehicle in one or more locations remote from the air compressor unit 30.

Although the bulk material spraying system 16 is shown in conjunction with a trailer-mounted bulk material distributing apparatus 12, it will be appreciated by those skilled in the art that an air flush system in accordance with the teachings of the present invention can alternatively be associated with any of a variety of spraying apparatuses which might be stationary, or might alternatively be supported upon any of a variety of vehicle types. For example, such an air flush system can be provided on virtually any type of vehicle having any type of bulk material spraying system, particularly when that vehicle does not already incorporate an engine-driven air compressor suitable to provide adequate quantities of air for purging a bulk material spraying system. Accordingly, a vehicle having a bulk material spraying system with an air flush system as discussed herein can comprise a trailer, a truck, and/or any of a variety of other vehicles, and can include a bulk material spraying system for spraying an of a variety of materials including, for example, those discussed herein.

The foregoing description of exemplary embodiments and examples of the invention has been presented for purposes of illustration and description. These examples and descriptions are not intended to be exhaustive or to limit the invention to the forms described. Numerous modifications are possible in light of the above teachings. Some of those modifications have been discussed, and others will be understood by those skilled in the art. It is hereby intended that the scope of the invention be defined by the claims appended hereto.

What is claimed is:

1. A vehicle comprising:
a mobile base;
an electrical system secured to the base and configured to provide direct current voltage;
a bulk material spraying system secured to the base and comprising:
a reservoir configured to store material for spraying;
a first conduit connected with the reservoir;
a second conduit;
a pump connected with both the first and second conduits, the pump being configured to receive material from the reservoir through the first conduit and to discharge received material through the second conduit;
a purge inlet provided in fluid communication with at least one of the first and second conduits; and
an air flush system secured to the base and comprising:
an air compressor unit, the air compressor unit integrally comprising:
a compressor including an electric motor configured to operate upon receipt of alternating current voltage;
a tank provided in fluid communication with the compressor and configured to store air compressed by the compressor; and
an outlet provided in fluid communication with the tank and configured to selectively dispense compressed air from the tank for passage to the purge inlet to facilitate purging of material from at least one of the first conduit, the second conduit, the pump, and the reservoir; and
an inverter electrically coupled with the electrical system and with the air compressor unit, the inverter being configured to selectively convert direct current voltage from the electrical system into alternating current voltage suitable to operate the compressor.

2. The vehicle of claim 1 wherein the air compressor unit further comprises a pressure sensitive switch in fluid communication with the tank, the pressure sensitive switch being configured to effect removal of electrical power from the electric motor when the pressure of compressed air within the tank reaches a predetermined value.

3. The vehicle of claim 1 further comprising an ignition switch, the ignition switch being configured to selectively facilitate electrical connection of the inverter to the electrical system.

4. The vehicle of claim 1 wherein the bulk material spraying system is configured to spray an aqueous slurry containing seed.

5. The vehicle of claim 1 wherein the mobile base comprises a trailer to which the electrical system, the bulk material spraying system, and the air flush system are secured.

6. The vehicle of claim 1 wherein the compressor comprises an oil-less compressor.

7. The vehicle of claim 1 wherein the tank has a capacity of between about 1.5 gallons and about 3 gallons.

8. The vehicle of claim 1 further comprising at least one additional purge inlet provided in fluid communication with at least one of the first and second conduits.

9. The vehicle of claim 1 further comprising a discharge hose having a nozzle, the second conduit being connected to the discharge hose.

10. The vehicle of claim 9 wherein the outlet is configured to selectively dispense compressed air from the tank for passage to the purge inlet to facilitate purging of material from the discharge hose.

11. The vehicle of claim 9 further comprising an additional purge inlet, the purge inlets respectively provided in fluid communication with the discharge hose and the second conduit and comprising quick-connect fittings configured for selectively and respectively connecting with the outlet.

12. The vehicle of claim 1 further comprising a discharge boom having a nozzle, the second conduit being connected to the discharge boom.

13. The vehicle of claim 12 wherein the outlet is configured to selectively dispense compressed air from the tank for passage to the purge inlet to facilitate purging of material from the discharge boom.

14. The vehicle of claim 1 further comprising a third conduit connected with both the second conduit and the reservoir, the third conduit being configured to provide recirculation of material from the pump to the reservoir.

15. The vehicle of claim 14 wherein the outlet is configured to selectively dispense compressed air from the tank for passage to the purge inlet to facilitate purging of material from the third conduit.

16. A bulk material distributing apparatus, comprising a bulk material spraying system for spraying bulk material from the apparatus and further comprising an air flush system, the air flush system comprising:
   an air compressor unit, the air compressor unit integrally comprising:
      a compressor including an electric motor configured to operate upon receipt of alternating current voltage;
      a tank provided in fluid communication with the compressor and configured to store air compressed by the compressor; and
      an outlet provided in fluid communication with the tank and configured to selectively dispense compressed air from the tank to a portion of the bulk material spraying system to facilitate purging of material from the bulk material spraying system; and
   an inverter electrically coupled with the air compressor unit and with an electrical system on the bulk material distributing apparatus, the inverter being configured to selectively convert direct current voltage from the electrical system on the bulk material distributing apparatus into alternating current voltage suitable to operate the compressor.

17. The bulk material distributing apparatus of claim 16 comprising a trailer to which the air compressor unit and the inverter are secured.

18. The bulk material distributing apparatus of claim 16 being configured to spray an aqueous slurry including seed.

19. The bulk material distributing apparatus of claim 16 being supported on a mobile base.

20. A method for cleaning a spraying apparatus, the method comprising:
   providing an air compressor unit integrally comprising:
      a compressor including an electric motor configured to operate upon receipt of alternating current voltage;
      a tank provided in fluid communication with the compressor and configured to store air compressed by the compressor; and
      an outlet provided in fluid communication with the tank;
   connecting the outlet of the air compressor unit to a purge inlet of the spraying apparatus, the purge inlet being in fluid communication with at least one of a conduit, a reservoir, a nozzle, and a pump provided on the spraying apparatus;
   providing alternating current voltage to the compressor to provide compressed air into the tank;
   discharging compressed air from the tank through the outlet and into the purge inlet for purging material from the spraying apparatus and; and
   providing an inverter electrically coupled with a direct current voltage source of the spraying apparatus, the inverter being configured to selectively convert direct current voltage into alternating current voltage suitable to operate the compressor.

21. The method of claim 20 wherein the spraying apparatus is supported on a vehicle.

22. The method of claim 20 wherein the air compressor unit is portable.

23. The method of claim 22 further comprising securing the portable air compressor unit to the spraying apparatus.

* * * * *